US010024440B2

(12) United States Patent
Richardson et al.

(10) Patent No.: US 10,024,440 B2
(45) Date of Patent: Jul. 17, 2018

(54) FUEL TANK VALVE ASSEMBLY

(71) Applicant: Filton Systems Engineering Ltd, Thornbury (GB)

(72) Inventors: Benjamin Richardson, Bristol (GB); John Austin, Bristol (GB); Alexander Colwood, Berkeley (GB); Christopher Cavey, Bristol (GB)

(73) Assignee: Filton Systems Engineering Ltd, Thornbury (GB)

( * ) Notice: Subject to any disclaimer, the term of this patent is extended or adjusted under 35 U.S.C. 154(b) by 140 days.

(21) Appl. No.: 14/731,010

(22) Filed: Jun. 4, 2015

(65) Prior Publication Data
US 2015/0354710 A1 Dec. 10, 2015

(30) Foreign Application Priority Data

Jun. 9, 2014  (GB) .................................. 1410227.1
Jun. 1, 2015  (EP) .................................. 15170017

(51) Int. Cl.
*F16K 1/52* (2006.01)
*F16K 1/36* (2006.01)
(Continued)

(52) U.S. Cl.
CPC ............. *F16K 1/526* (2013.01); *B01D 63/00* (2013.01); *B23P 15/001* (2013.01); *B64D 37/005* (2013.01); *B64D 37/20* (2013.01); *F16K 1/36* (2013.01); *F16K 15/026* (2013.01); *F16K 15/028* (2013.01); *F16K 24/02* (2013.01); *F16K 24/04* (2013.01); *B01D 2313/12* (2013.01); *B01D 2313/18* (2013.01); *B60K 2015/03276* (2013.01); *Y10T 29/49414* (2015.01)

(58) Field of Classification Search
None
See application file for complete search history.

(56) References Cited

U.S. PATENT DOCUMENTS 3,079,941 A   3/1963   Cruise et al.
4,328,825 A   5/1982   Bishai
(Continued)

FOREIGN PATENT DOCUMENTS

DE        10349543 B3      11/2004
WO    WO-2008037561 A1     4/2008
WO    WO-2008110838 A1     9/2008

OTHER PUBLICATIONS

Nair et al. ("Unimpeded permeation of water through helium-leak-tight graphene-based membranes." Science, vol. 335, Jan. 27, 2012, p. 442-444).*

(Continued)

*Primary Examiner* — Krishnan S Menon
*Assistant Examiner* — Ryan B Huang
(74) *Attorney, Agent, or Firm* — Honigman Miller Schwartz and Cohn LLP

(57) ABSTRACT

There is disclosed a fuel tank valve assembly 24 for a fuel tank 4. The fuel tank valve assembly comprises a discharge valve 30 which in normal operation is closed, and which can be opened to discharge fluid from the fuel tank; and a water passageway 56 across which extends a membrane 60 which is permeable to water but impermeable to fuel. There is also disclosed a fuel tank 4 comprising a fuel tank valve assembly 24.

17 Claims, 8 Drawing Sheets

(51) Int. Cl.
*B23P 15/00* (2006.01)
*B01D 63/00* (2006.01)
*F16K 15/02* (2006.01)
*F16K 24/02* (2006.01)
*F16K 24/04* (2006.01)
*B64D 37/00* (2006.01)
*B64D 37/20* (2006.01)
*B60K 15/03* (2006.01)

(56) References Cited

U.S. PATENT DOCUMENTS

| | | | | |
|---|---|---|---|---|
| 4,440,193 | A * | 4/1984 | Matheson | B01D 36/006 |
| | | | | 116/109 |
| 8,282,824 | B2 * | 10/2012 | Brielmann | B01D 36/008 |
| | | | | 210/114 |
| 2008/0315038 | A1 | 12/2008 | Wyatt | |
| 2013/0330833 | A1 | 12/2013 | Ruiz et al. | |

OTHER PUBLICATIONS

UK Search Report for Application GB1410227.1 dated Oct. 3, 2014.
EP International Search Report of Application No. 15170017.6 dated Oct. 16, 2015.

* cited by examiner

FUEL TANK VALVE ASSEMBLY

CROSS-REFERENCE TO RELATED APPLICATIONS

The present application claims priority to GB 1410227.1 filed on 9 Jun. 2014 and to EP 15170017.6 filed on 1 Jun. 2015, which are hereby incorporated by reference in their entirety for any and all purposes.

BACKGROUND

Embodiments relate to a fuel tank valve assembly for a fuel tank, and particularly, although not exclusively, to a fuel tank valve assembly comprising a membrane which allows water to continuously drain through the valve assembly, whilst retaining fuel within the fuel tank.

Fuel tanks, and in particular aircraft fuel tanks, are known to be susceptible to water ingress. For example, aircraft fuel tanks are provided with an opening which ensures that the interior of the fuel tank is at atmospheric pressure. However, water may undesirably enter the fuel tank through this opening. For example, during operation, as the aircraft descends warm humid air may be draw into the fuel tank, and water may condense within the fuel tank which is cold since it has been at high altitude. Once within the tank the water mixes with the fuel and settles at the bottom of the tank.

The presence of water within a fuel tank is the cause a number of potentially serious problems. These may affect not only the fuel tank itself, but also its surrounding systems. From a purely economic standpoint, not only does water contamination reduce the amount of fuel that may be stored within a fuel tank, the water that is carried is deadweight. From a more technical standpoint, water contamination may lead to bio-contamination, which may in turn reduce the effectiveness of a fuel or render it unfit for use altogether. Significantly, since aircraft are exposed to extremely low temperatures at high altitudes, water collected within fuel tank may freeze. This may reduce the effective volume of the tank. Further, if water enters other parts of the fuel delivery system, it may freeze and cause more serious problems.

It is known to use a scavenge pump to remove water from the bottom of a tank. Scavenge pumps are typically in the form of an ejector pump and act to draw fluid (including water) from the lower region of the fuel tank and feed it into the engine fuel inlet.

Aircraft fuel tanks are also typically provided with a drainage valve that is located towards the bottom of the tank. Periodically an operator/engineer will manually open the discharge valve so as to release fluid from the bottom of the fuel tank. Water will initially be discharged from the discharge valve, before fuel starts to be discharged. If the scavenge pump has been working as intended, little water should be released before fuel starts to be discharged. If the scavenge pump has not been working correctly, a significant amount of water may be discharged from the fuel tank. This may indicate to the operator/engineer that the scavenge pump may need to be replaced or fixed.

Whilst this arrangement for removing water from a fuel tank may be satisfactory, it requires a scavenge pump which may be susceptible to failure, and a manual operation is required to operate the discharge valve to discharge any excess water.

It is therefore desirable to provide an improved arrangement from removing water from a fuel tank.

SUMMARY

According to an aspect there is provided a fuel tank valve assembly for a fuel tank, comprising: a discharge valve which in normal operation is closed, and which can be opened to discharge fluid from the fuel tank; and a water passageway across which extends a membrane which is permeable to water but impermeable to fuel. This may allow water to passively drain from the fuel tank through the valve assembly, whilst fuel is retained within the fuel tank. Water may be able to drain through the water passageway and membrane regardless of the position of the discharge valve. This means that even if the discharge valve is closed, water can still be passively discharged from the fuel tank. In use, the water passageway may provide fluid communication between the interior of the fuel tank and the exterior of the fuel tank.

The membrane may comprise a graphene-based compound. The membrane may comprise graphene oxide. The membrane may comprise a plurality of layers of a graphene-based compound, such as a plurality of layers of graphene oxide. The membrane may comprise a backing member supporting the or each layer of a graphene-based compound such as graphene oxide.

The water passageway may extend through the valve assembly. The water passageway and membrane may be arranged such that in use, when the discharge valve is closed (i.e. regardless of the position of the discharge valve), water can pass through the membrane and exit the valve assembly. When the discharge valve is closed only water may be able to exit the valve assembly.

The discharge valve may be biased closed. A manual operation may be required to open the discharge valve.

The fuel tank valve assembly may further comprise a valve assembly housing defining a valve chamber. The valve assembly housing may be generally cylindrical. The valve assembly housing may be provided with an inlet, which in use is within the fuel tank such that fluid within the fuel tank (such as fuel/water) can enter the valve chamber. The discharge valve may be disposed within the valve assembly housing. The water passageway may provide fluid communication from the valve chamber to the exterior of the valve assembly.

The discharge valve may comprise first and second valve elements, one of which comprises a valve seat and the other of which comprises a valve member moveable between at least an open position and a closed position so as to open and close the discharge valve. The valve member may be biased to the closed position. The valve member may be axially moveable.

The first and/or second valve elements may be replaceable components. The valve member and/or the valve seat may be replaceable.

The valve member may be detachably coupled to a secondary valve member. The valve member may be forced into contact with the secondary valve member by a biasing force. When the valve member is removed, the secondary valve member may cooperate with a valve seat to close the discharge valve. This may allow the valve member to be removed and replaced whilst maintaining the discharge valve close, thus preventing the leakage of fuel from the fuel tank. The secondary valve member may be arranged to cooperate with a secondary valve seat. The secondary valve seat may be an annular shoulder formed by the valve assembly housing and may not be a replaceable component.

The valve seat may be detachably attached to a valve assembly housing. The valve seat may be threaded into a fluid outlet of the valve assembly housing.

The water passageway may extend through one of the valve elements. The water passageway may extend through the valve seat or the valve member.

Embodiments also relate to a retrofittable valve element (such as a valve member or a valve seat) for use with a fuel tank valve assembly in accordance with any statement herein.

According to another aspect there is provided a retrofittable valve element for a discharge valve of a fuel tank valve assembly comprising a water passageway extending therethrough and across which extends a membrane which is permeable to water but impermeable to fuel. The retrofittable valve element may comprise a valve member or a valve seat.

Embodiments also relate to a fuel tank comprising a fuel tank valve assembly in accordance with any statement herein. The fuel tank may be a vehicle fuel tank, such as an aircraft fuel tank.

Embodiments also relate to a vehicle comprising a fuel tank in accordance with any statement herein. The vehicle may be an aircraft.

According to another aspect there is provided a method of modifying an existing fuel tank valve assembly comprising a discharge valve which in normal operation is closed, and which can be opened to discharge fluid from the fuel tank, the discharge valve comprising first and second valve elements, one of which comprises a valve seat and the other of which comprises a valve member moveable between at least an open position and a closed position so as to open and close the discharge valve, the method comprising: removing at least one of the valve elements from the discharge valve; and attaching at least one replacement valve element to the discharge valve which comprises a water passageway extending therethrough and across which extends a membrane which is permeable to water but impermeable to fuel. It may be possible to access the first and/or second valve element from outside of the fuel tank.

Both the first and the second valve elements may be removed from the discharge valve. The first valve element comprising a valve seat may be removed prior to removal of the second valve element comprising a valve member.

According to another aspect there is provided a drainage port for a fuel tank comprising a water passageway across which extends a membrane which is permeable to water but impermeable to fuel. There may also be provided a fuel tank comprising a drainage port comprising a water passageway across which extends a membrane which is permeable to water but impermeable to fuel. The drainage port may be provided with a filter or strainer spaced from the membrane which is arranged to restrict particulate matter from coming into contact with the membrane. The filter may be arranged to be inside the fuel tank. The drainage port may be arranged to be installed, such as detachably installed, in the wall of a fuel tank. The drainage port may be arranged to be threaded into the wall of a fuel tank. The membrane may be graphene based and may comprise graphene oxide. The drainage port may allow the automatic and passive drainage of water.

According to yet another aspect there is provided an in-line water drain for a pipe, such as a fuel pipe, comprising a drain body having an inlet and an outlet which can be fluidically connected to an inlet and an outlet pipe, and a water passageway extending through the drain body and across which extends a membrane which is permeable to water but impermeable to fuel. The water drain may allow the automatic and passive drainage of water from fluid flowing in the pipe.

Embodiments may comprise any combination of the features and/or limitations referred to herein, except combinations of such features as are mutually exclusive.

BRIEF DESCRIPTION OF THE DRAWINGS

Embodiments will now be described, by way of example, with reference to the accompanying drawings, in which:—

DETAILED DESCRIPTION

Figure 1:
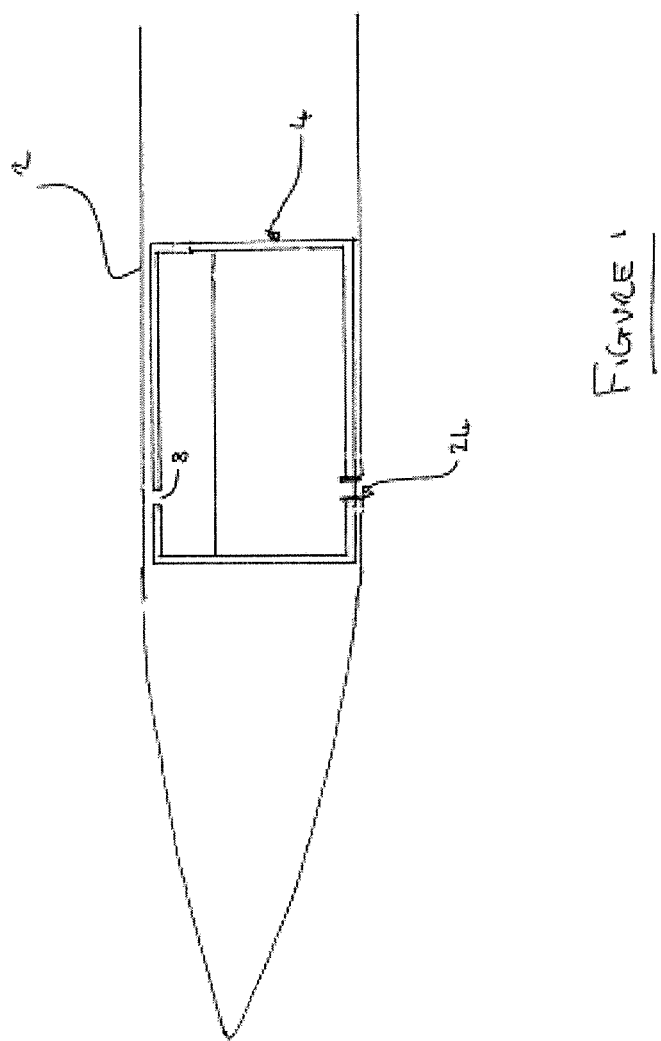
FIG. 1 schematically shows a cross-sectional side view of a fuel tank, comprising a fuel tank valve assembly, disposed within an aircraft wing.

FIG. 1 shows an aircraft wing 2 in which is disposed a fuel tank 4 for carrying aircraft fuel. A passageway 8 extends through the fuel tank 4 which ensures that the interior of the fuel tank is at ambient pressure. However, this may allow the ingress of water into the fuel tank 4. A scavenge pump system (not shown) may be provided to remove water from a lower region of the fuel tank 4. A fuel tank valve assembly 24 is installed in a lower region of the fuel tank 4. As will be described in detail below, the fuel tank valve assembly 24 allows water to continuously drain from the fuel tank 4 to the atmosphere through the valve assembly 24, whilst retaining fuel within the fuel tank 4. However, the fuel tank valve assembly 24 can be manually operated to discharge the fluid residing in the bottom of the fuel tank 24 to test fuel quality, for example.

Figure 2:
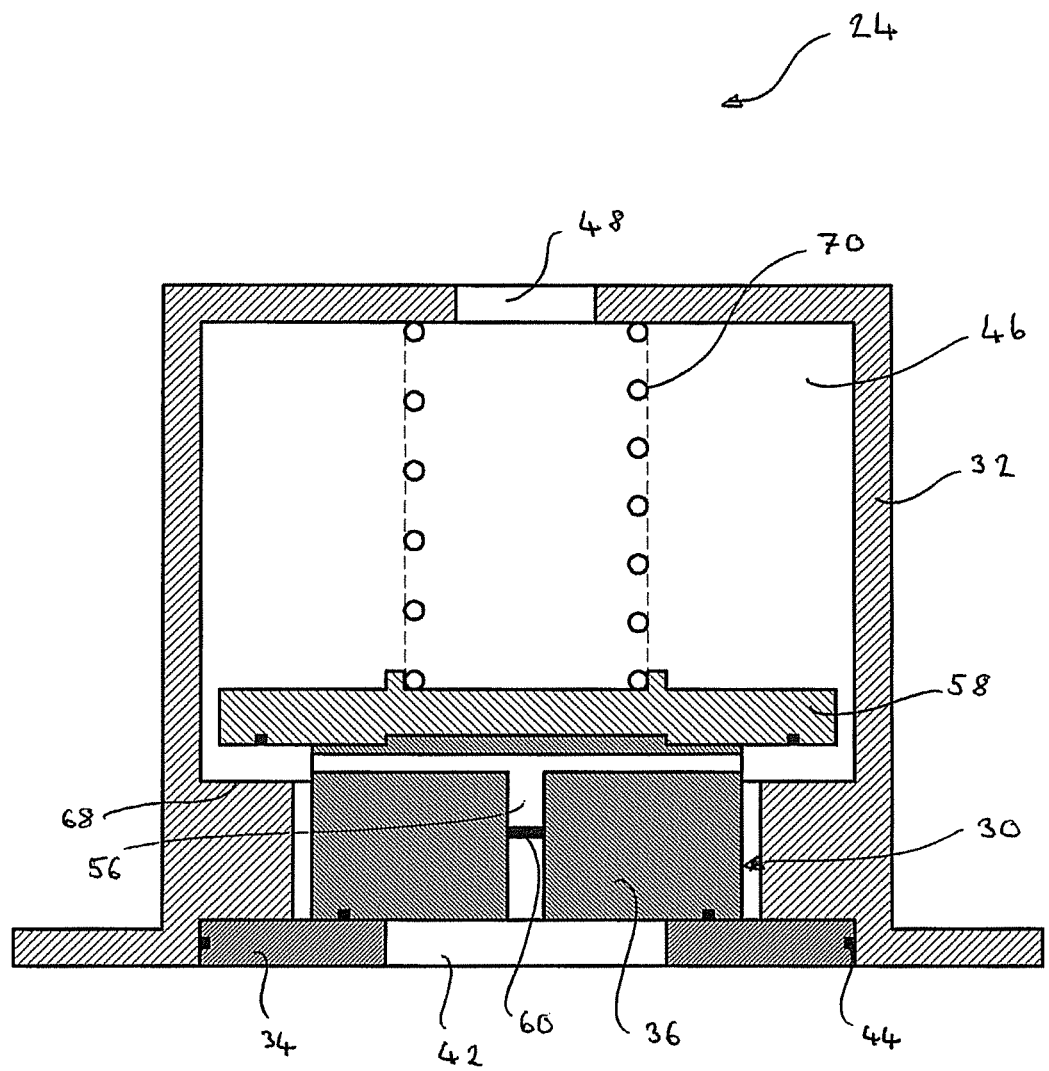
FIG. 2 schematically shows a cross-sectional view of the fuel tank valve assembly of FIG. 1 in a closed position.

As shown in FIG. 2 the fuel tank valve assembly 24 comprises a generally cylindrical valve assembly housing 32 within which a discharge valve 30 is disposed. The valve assembly housing 32 defines a valve chamber 46 and a bore extends through an upper end of the housing 32 which provides a fluid inlet 48 into the valve chamber 46. In use, the fluid inlet 48 is disposed within a lower portion of the fuel tank 4 such that fluid towards the bottom of the tank 4 enters the valve chamber. The valve assembly housing 32 also comprises a fluid outlet 42 towards the bottom of the housing 32 that in use is disposed outside of the fuel tank 4 and through which fluid can be discharged.

A removable maintainable valve seat 34 in the form of an annular ring (or collar) is threaded into the fluid outlet 42. The valve seat 34 can be removed and replaced as required. An O-ring is provided in a groove in the outer surface of the valve seat 34 which seals against the inner surface of the fluid outlet 42. The interior of the valve assembly housing 32 is also provided with an annular shoulder which forms a secondary annular valve seat 68 that is located above the valve seat 34. A replaceable valve member 36 is threadedly attached to a secondary valve member 58. O-rings are provided on the sealing faces of the valve member 36 and the secondary valve member 58 to seal against the corresponding valve seats 34, 68. The assembly of the valve member 36 and the secondary valve member 58 is disposed within the valve assembly housing 32 and can axially slide within it.

Figure 3:
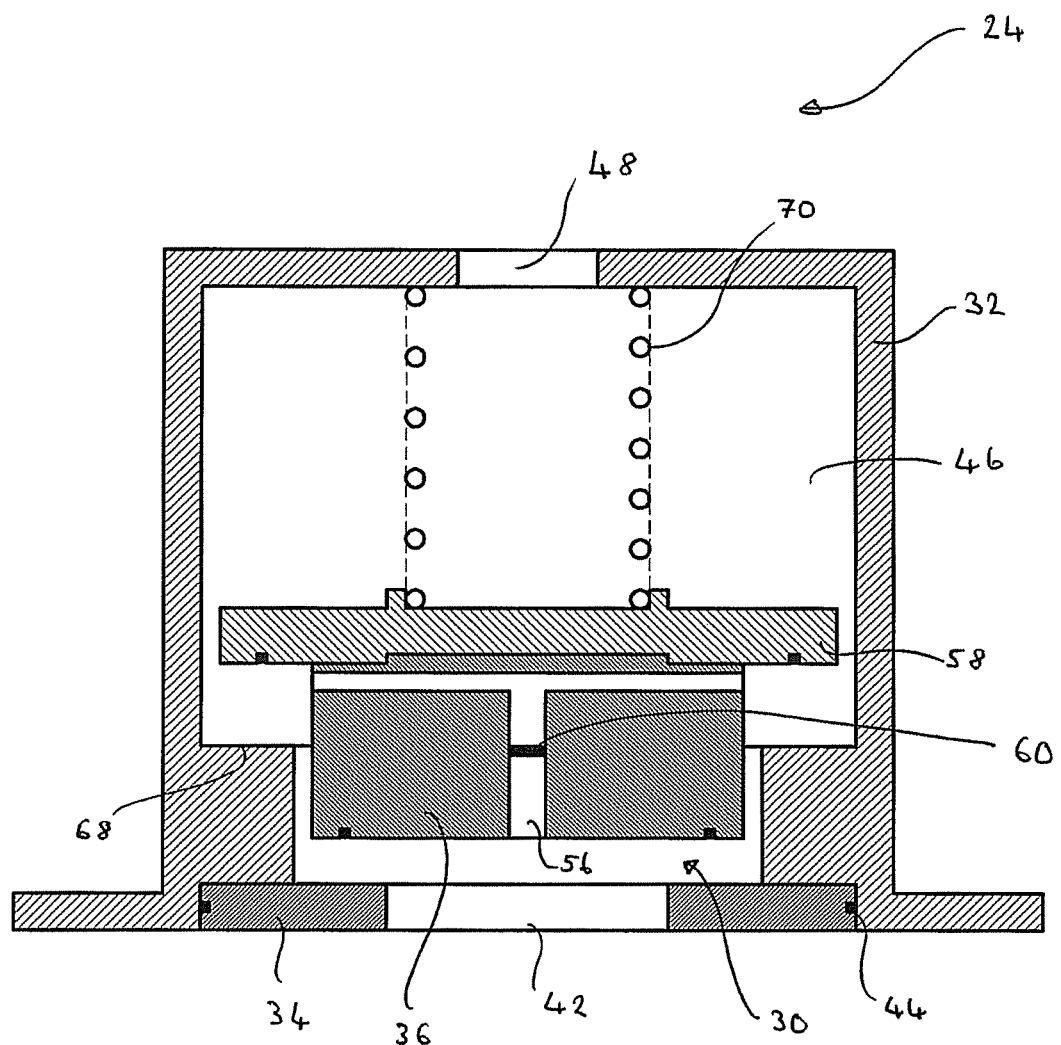
FIG. 3 schematically shows a cross-sectional view of the fuel tank valve assembly of FIG. 1 in an open position.

The assembly of the valve member 36 and the secondary valve member 58 forms part of a discharge valve 30 that also comprises the valve seat 34 and the secondary valve seat 68. The valve member 36 can move between a closed position (FIG. 2) in which the valve member 36 seals against the valve seat 34 to prevent fuel exiting the fuel tank 4 through the valve assembly 24, and an open position (FIG. 3) in which the valve member 36 is axially spaced from the valve seat 34 such that fuel can be discharged from the fuel tank 4 through the valve assembly 24. A biasing means in the form of a spring 70 acts between the housing 32 and the secondary valve member 58 to bias the discharge valve 30 to the closed position. In both the open and closed positions, the secondary valve member 58 is spaced from the secondary valve seat 68.

An axial bore defining a water passageway 56 extends through the valve member 36. The water passageway 56 provides fluid communication from the interior of the valve chamber 46 to outside of the valve housing 32. In this embodiment the water passageway 56 comprises a plurality of radial passageways, extending from the outer surface of an upper portion of the valve member 36, that communicate with a central passageway extending along the longitudinal axis of the valve member 36 towards the fluid outlet 42. Importantly, a graphene oxide membrane 60 is disposed within and across the water passageway 56 such that for fluid to flow through the passageway 56 it must pass through the membrane 60. The membrane 60 may be secured within the passageway 56 using an adhesive, for example. The graphene-based membrane 60 is permeable to water, but is impermeable to fuel. In one embodiment, the membrane 60 may be a laminate comprising a plurality of layers of graphene oxide. Each layer of graphene oxide may be one atom thick (approximately one micron). The layer or layers of graphene oxide may be supported on a backing structure or layer to increase rigidity. This may form a particularly strong structure, whilst also providing a membrane (or filter) which allows water to pass through it, but preventing the passage of fuel therethrough.

In use, the fuel tank valve assembly 24 is installed within a wall in the bottom of a fuel tank 4. Since the valve member 36 is biased to the closed position, the discharge valve 30 is closed as it is seated against the valve seat 34. Initially, only fuel is stored within the fuel tank 4. This fuel does not exit the valve assembly 24 through the discharge valve 30 since it is normally closed, and cannot exit through the water passageway 56 as the membrane 60 which extends across is impermeable to fuel. However, as explained above, during operation, water may enter the fuel tank 4 and mix with the fuel within it. Over time, this water will sink to the bottom of the fuel tank 4 and will enter the valve chamber 46 through the inlet 48. Although the discharge valve 30 is normally closed (FIG. 2), since the graphene oxide membrane 60 is permeable to water 20, the water will pass through it and will flow through the water passageway 56. Therefore, any water within the fuel tank will automatically and continuously be discharged out of the fuel tank 4 to the atmosphere through the water passageway 54, without the need to open the discharge valve 30. The valve assembly 24 therefore prevents the undesirable accumulation of water within the fuel tank 4, and a scavenge pump may no longer be required. Periodically, the discharge valve 30 can be opened by axially moving the valve member 36 to the open position (FIG. 3) in which it is spaced from the valve seat 34 to discharge fluid from the bottom of the fuel tank 4. This allows an operator to check that no water is indeed present in the bottom of the tank 4 (i.e. it has all exited the fuel tank 4 through the water passageway 56). However, since water is allowed to passively drain through the valve assembly 24 (even when the discharge valve 30 is closed), the interval at which the discharge valve 30 is opened can be increased.

It may be possible to modify an existing fuel tank valve assembly 24' comprising a discharge valve 30' by retrofitting a valve element, such as a valve member 36, having a water passageway 56 and a membrane 60. Such a modification would result in a fuel tank valve assembly 24 which allows water to automatically and continuously drain from the fuel tank 4, whilst retaining fuel within it.

Figure 4:
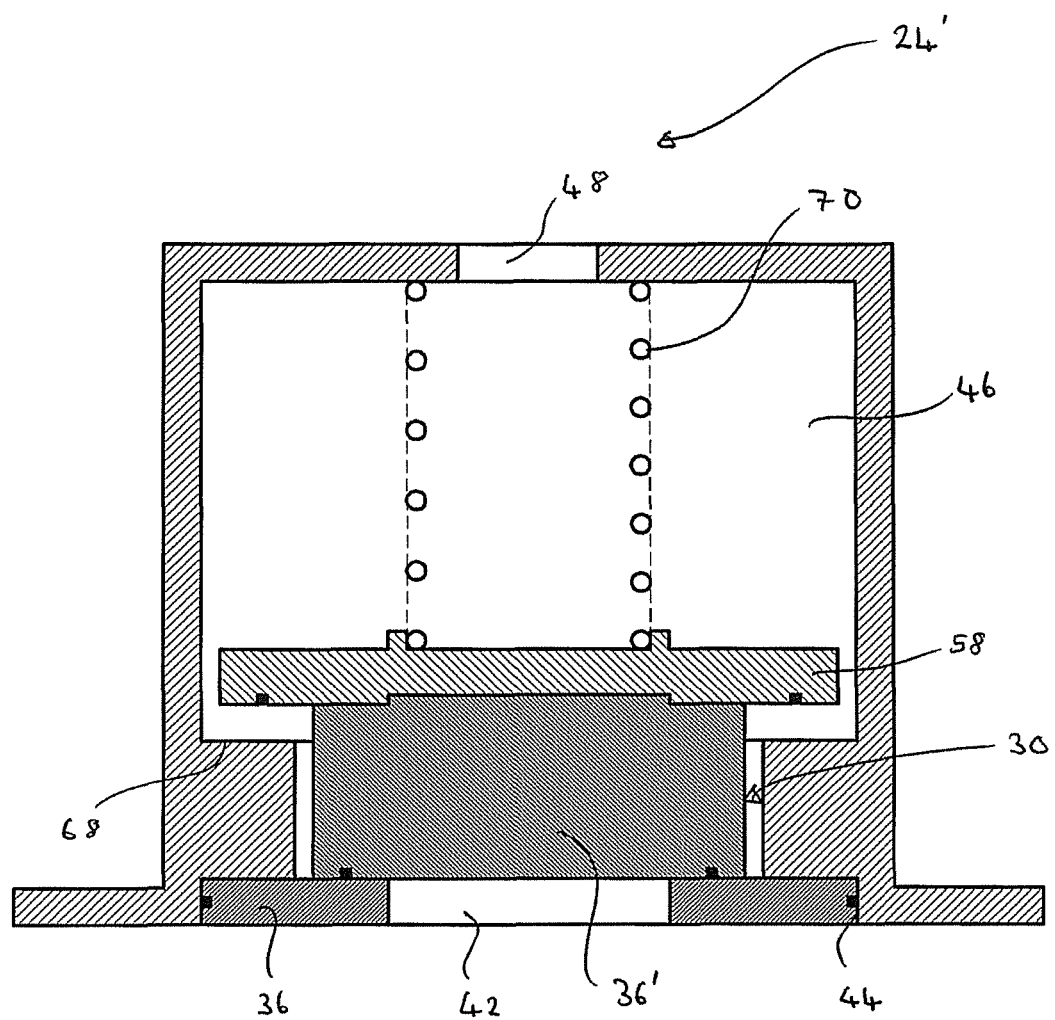
FIG. 4 schematically shows a cross-sectional view of an existing fuel tank valve assembly prior to retrofitting.

FIG. 4 shows a standard fuel tank valve assembly 24 comprising a discharge valve 30 that is biased closed and which can be opened to discharge fluid (such as fuel or water) from the bottom of a fuel tank 4. The valve assembly 24 is substantially the same as that described with reference to FIGS. 2 and 3, except the valve member 36' has no water passageway 56 or membrane 60. With this fuel tank valve assembly, the discharge valve 30 must be manually opened to discharge any water from the fuel tank.

Figure 5:
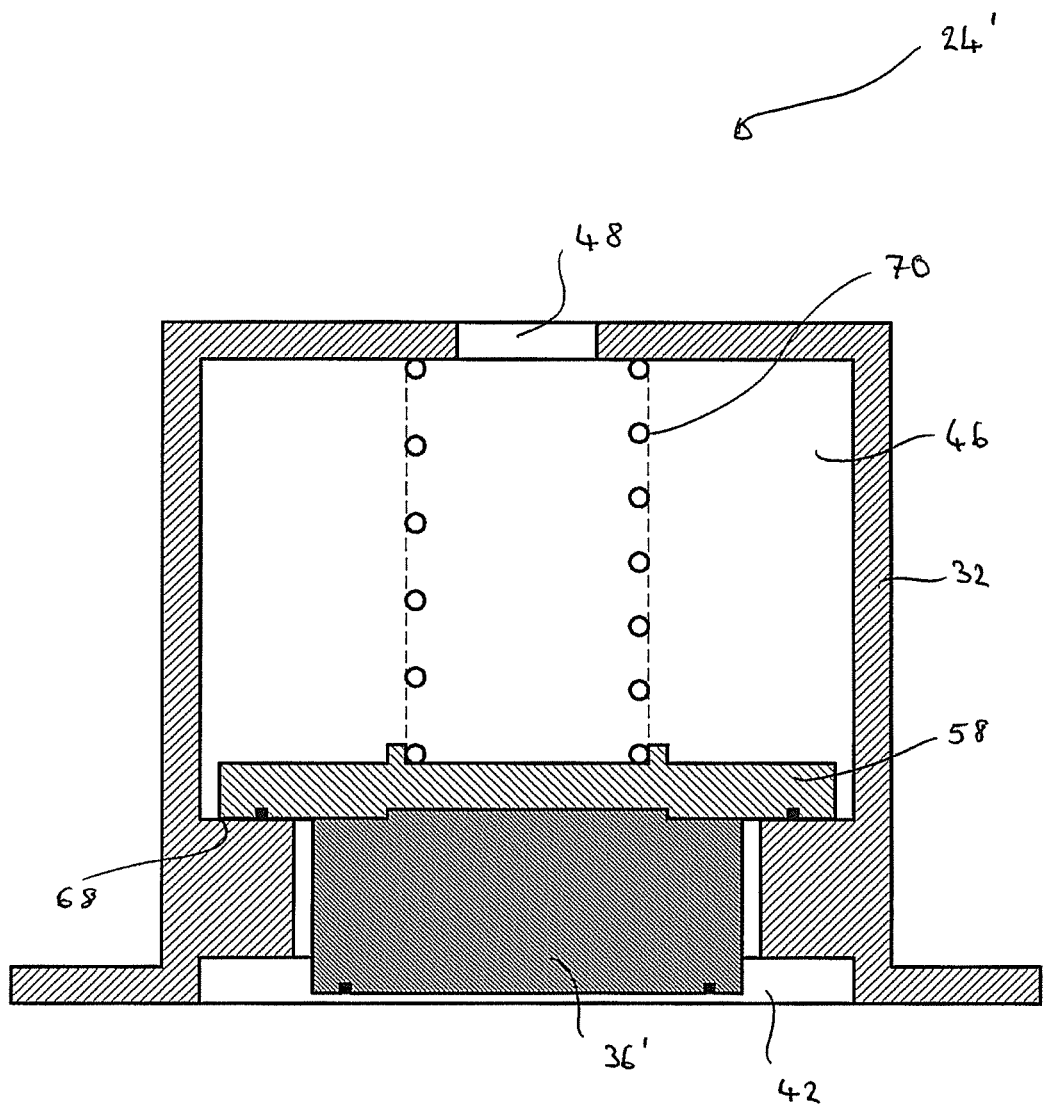
FIG. 5 schematically shows a cross-sectional view of the existing fuel tank valve assembly of FIG. 4 with the valve seat removed.

In order to modify the valve assembly 24, the valve seat 34 is unscrewed from the fluid outlet 42 of the valve assembly housing 32. As shown in FIG. 5, with the valve seat 34 removed, the discharge valve 30 is maintained closed as the secondary valve member 58 is resiliently biased against the secondary valve seat 68, thereby forming a seal. This prevents any fuel 6 and/or water 20 leakage.

Figure 6:
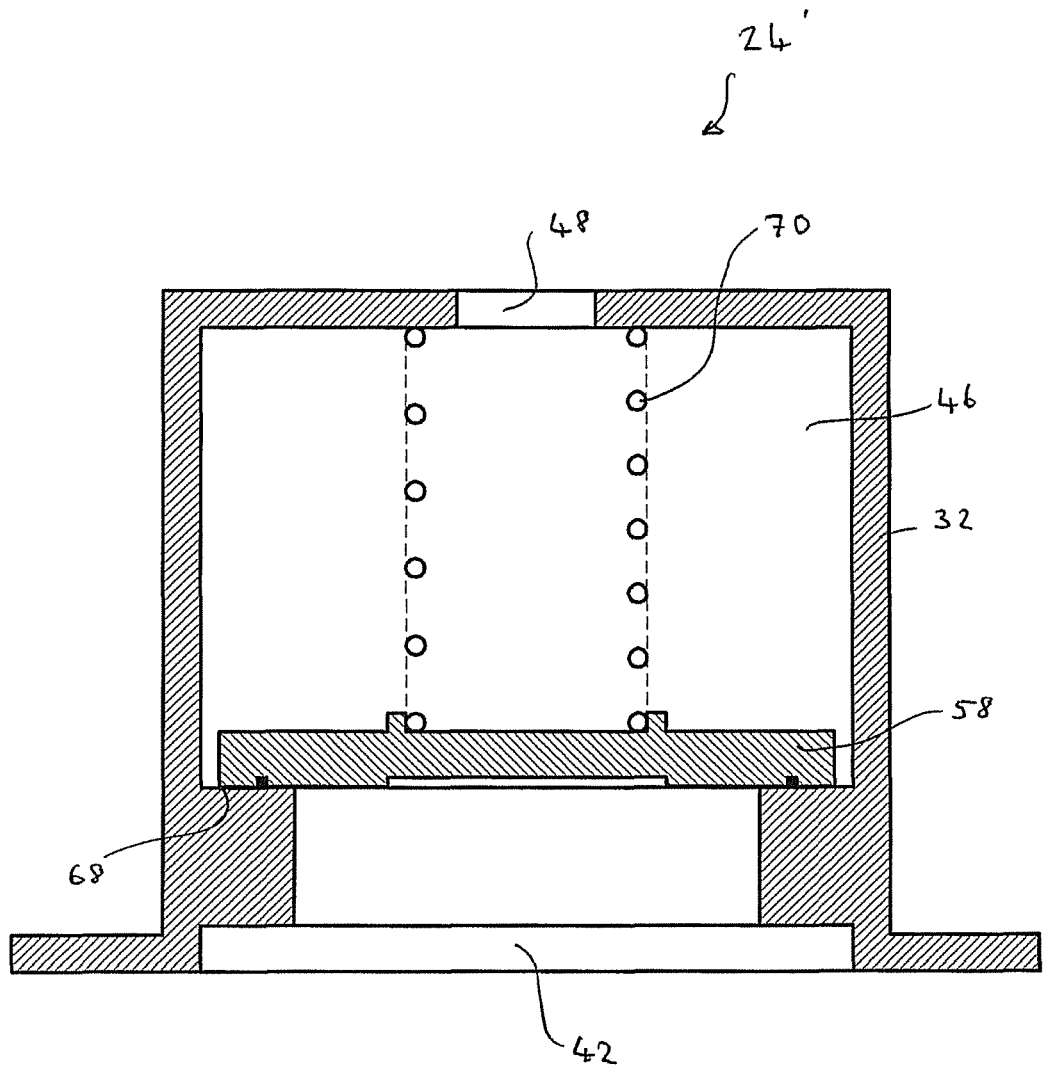
FIG. 6 schematically shows a cross-sectional view of the existing fuel tank valve assembly with of FIG. 4 with the valve seat and valve member removed.

As shown in FIG. 6, following removal of the valve seat 34 the existing valve member 36' is detached from the valve element 57 by unscrewing it. The valve member 36' is then replaced by a valve member 36 provided with a water passageway 56 and graphene oxide membrane 60 by screwing the replacement valve member 36 to the valve element 57. A valve seat 68 (either the old one or a new one) is then threaded into the fluid outlet 42. This results in a fuel tank valve assembly 24 similar to that shown in FIG. 2. Advantageously, this allows an existing fuel tank valve assembly 24' to be upgraded to allow passive water draining, without replacing the entire component.

Although it has been described that the water passageway 56 and membrane 60 are provided in the replaceable valve member 36, it should be appreciated that the water passageway 56 could extend through the valve seat 34. The valve seat and/or valve member could be detachably attached by means other than threading. Further, in other embodiments the valve seat 34 and valve member 36 may not be replaceable components. In one embodiment, the valve member 36 is captured between the valve seat 34 and the secondary valve member 58 by the spring acting on the secondary valve member.

Figure 7:
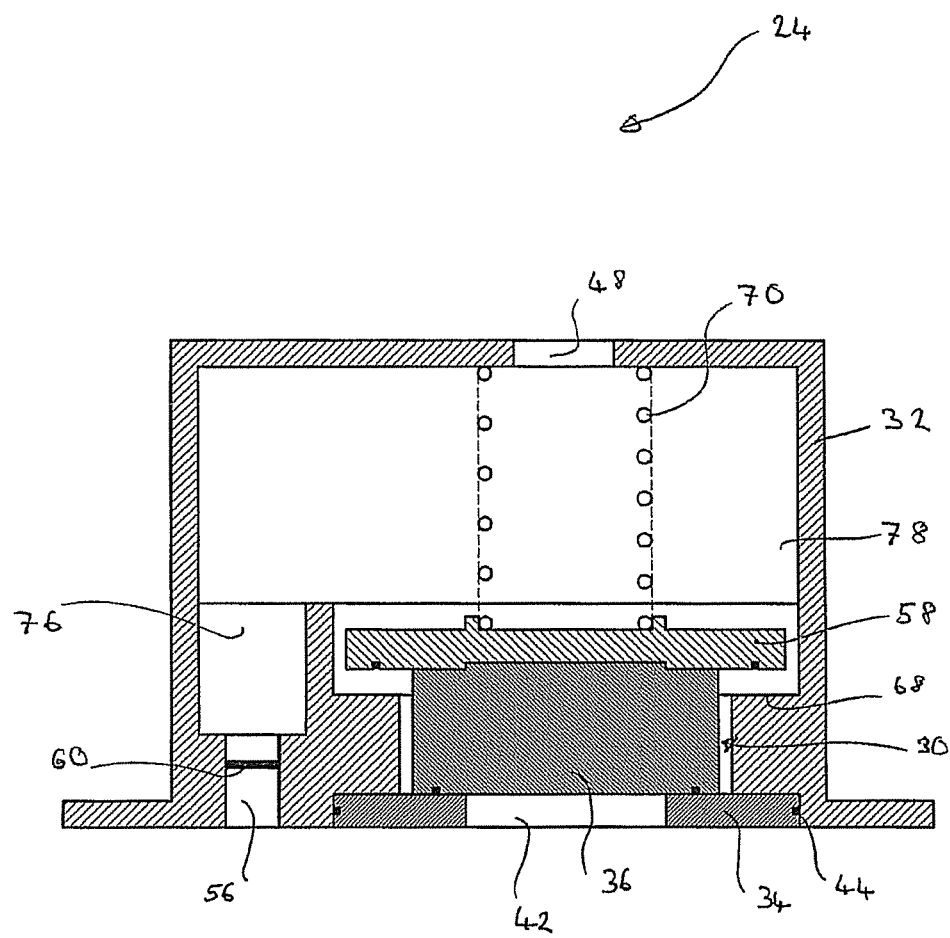
FIG. 7 schematically shows a cross-sectional view of a further embodiment of a fuel tank valve assembly.

FIG. 7 shows a second embodiment of a fuel tank valve assembly 24. However, in this embodiment the discharge valve 30 and the water passageway 56 are separate but housed within a common valve assembly housing 32. Specifically, the water passageway 56 with membrane 60 is in parallel to the discharge valve 30, as opposed to passing through the valve member 36. In this embodiment, the valve assembly housing 32 defines a first valve chamber 76 and a second valve chamber 78. A water passageway 56 passes through the housing 32 and provides fluid communication between the first valve chamber 76 and the outside of the valve assembly 24. As for the first embodiment, a graphene oxide membrane 60 extends across the water passageway 56 and is permeable to water but impermeable to fuel. A discharge valve 30 is disposed in the second fluid chamber 78 and is biased normally closed. The discharge valve 30 is substantially the same as shown in FIG. 4.

In use, fluid containing water, fuel or a mixture thereof enters into the valve housing 32 through the inlet 48. Any water within the fluid will pass through the membrane 60 disposed within the water passageway 56 and will therefore be automatically and passively discharged from the fuel tank 4. Since the membrane 60 is impermeable to fuel, the fuel will be retained within the tank 4. As for the first embodiment, if necessary, the discharge valve 30 can be opened to discharge fluid containing water, fuel or a mixture thereof.

Although the membrane 60 has been described as comprising graphene oxide, it will be appreciated that the membrane 60 may comprise any material that is both permeable to water and impermeable to fuel. This material may or may not be graphene-based. It has been described that the water passageway 56 is provided with a single membrane 60, however, it should be appreciated that additional membranes or filter elements may also be provided. For example, a filter may be located upstream of the graphene oxide membrane 60 for removing particulate matter such as grit.

In the above described embodiments it has been described that the discharge valve is biased closed and can be opened by moving the valve member axially. However, in other embodiments the discharge valve could be or a tap or the like which must be unscrewed to open and close it.

Figure 8:
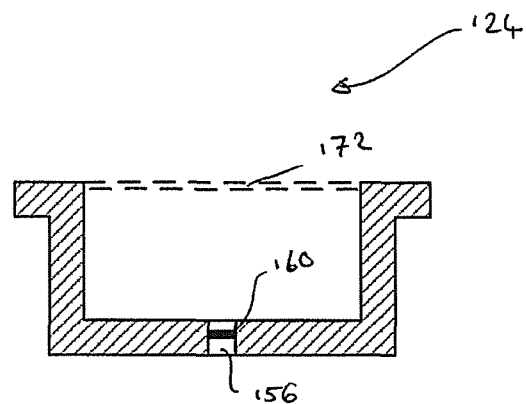
FIG. 8 schematically shows a cross-sectional view of a drain port.

As shown in FIG. 8, in a further aspect there may be no discharge valve and simply a water drain port 124 having a water passageway 156 across which extends a membrane 160 that is permeable to water but impermeable to fuel (such as the graphene based membrane described above with respect to the other embodiments). The port 124 could be installed in the bottom of a fuel tank to allow the passive draining of water. Further, the port may also comprise a mesh filter (or sieve) 172 arranged to prevent particulate from contacting the membrane 160 and blocking it. The mesh filter 172 would of course allow both water and fuel to pass through it, whilst the membrane 160 would only allow water to pass through it. The water drain port may be useful for a domestic fuel tank.

Figure 9:
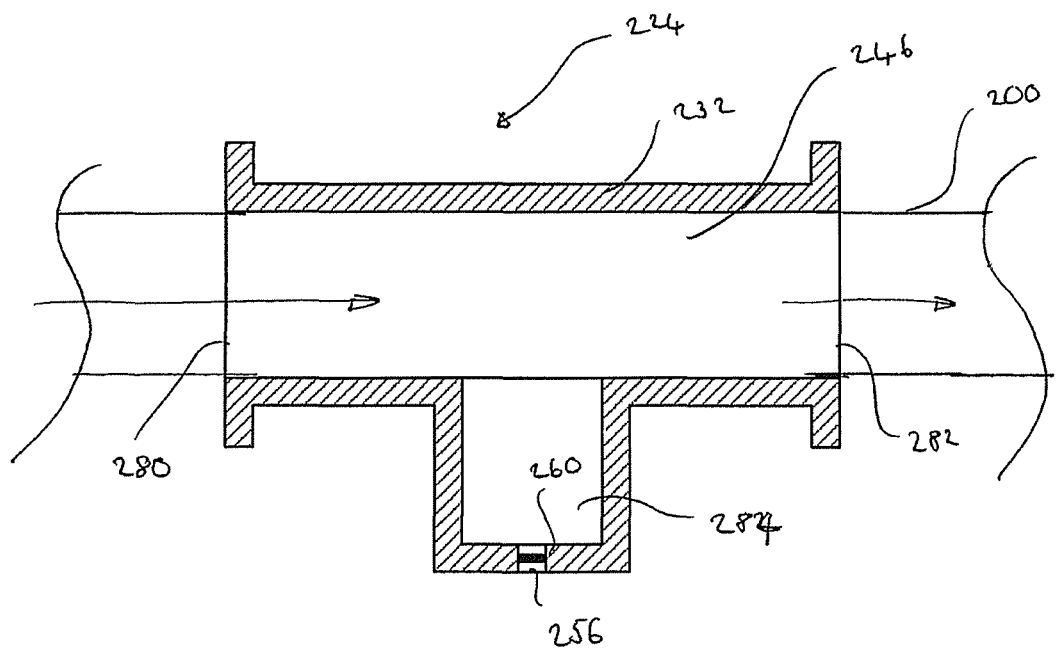
FIG. 9 schematically shows a cross-sectional view of an in-line water drain.

As shown in FIG. 9, in a further embodiment, there is provided an in-line water drain 224 for a fluid pipe 200. The water drain 24 comprises a drain body 232 defining a chamber 246, and the drain 246 also comprises a coaxial inlet 280 and outlet 282 which open into the chamber 246. A trap basin 284 is provided between the inlet and outlet 280, 282 and a water passageway 256 extends through the wall of the trap 282. A graphene oxide membrane 260 extends across the passageway 256. As for the other embodiments, the membrane 260 is permeable to water but impermeable to fuel. The water drain 224 can be fitted in-line in a pipe such that fluid flowing in the pipe passes through the chamber 246. It may be possible to retrofit the drain by cutting a pipe and installing the water drain 224. The water drain 224 could be used in an aircraft fuel pipe and installed at a low-point in the pipework. In use, any water in the fuel will collect in the trap 282 and will pass through the graphene membrane 256, exiting the fuel system. However, since the membrane is impermeable to fuel, the fuel will be retained in the pipe.

Although it has been described that the fuel tank valve assembly is for an aircraft fuel tank, it should be appreciated that it could be used in any fuel tank, such as a domestic fuel tank.

The invention claimed is:

1. An assembly, comprising:
a closure member having an upstream-facing surface and a downstream-facing surface, wherein a fluid discharge passage extends through the closure member between the upstream-facing surface and the downstream-facing surface, wherein the upstream-facing surface of the closure member defines a first valve seat;
a housing defining a fluid inlet, a fluid outlet and a chamber, wherein the fluid inlet is in fluid communication with the fluid outlet by way of the chamber, wherein an interior surface of the housing that defines the chamber includes a shoulder surface that defines a second valve seat, wherein the closure member is removably-attached to a portion of the housing that defines the fluid outlet;
a biased-closed valve member movably-disposed within the chamber, wherein the biased-closed valve member includes a first portion and a second portion, wherein the first portion of the biased-closed valve member defines a water passageway; and
a membrane that is permeable to water but impermeable to fuel is disposed within the water passageway,
wherein selective attachment of the closure member to the housing configures the biased-closed valve member in a first orientation defined by:
the first portion of the biased-closed valve member engaged with the first valve seat whereby the fluid discharge passage, the water passageway and chamber permit fluid communication between the fluid inlet and the fluid outlet, and
wherein selective detachment of the closure member from the housing configures the biased-closed valve member in a second orientation defined by:
the second portion of the biased-closed valve member engaged with the second valve seat thereby denying fluid communication between the fluid inlet and the fluid outlet.

2. The assembly according to claim 1, wherein the membrane is defined by a graphene-based compound.

3. The assembly according to claim 1, wherein the membrane is defined by graphene oxide.

4. The assembly according to claim 1, wherein the water passageway is defined by at least one radial passageway portion that radially extends through the first portion of the biased-closed valve member, wherein the water passageway is further defined by an axial passageway that axially extends through the first portion of the biased-closed valve member, wherein the axial passageway is in fluid communication with the at least one radial passageway, wherein the membrane is disposed within the axial passageway of the water passageway.

5. The assembly according to claim 1, wherein configuration of the biased-closed valve member in the first orientation permits water to pass:
through the membrane,
through the fluid discharge passage, and
out of the assembly by way of the fluid outlet.

6. The assembly according to claim 1, wherein the housing includes an upstream end and a downstream end, wherein the upstream end defines the fluid inlet, wherein the downstream end defines the fluid outlet.

7. The assembly according to claim 6, wherein the second portion of the biased-closed valve member includes an upstream-facing surface and a downstream-facing surface.

8. The assembly according to claim 7, wherein the assembly further comprises:
 a spring arranged within the chamber, wherein the spring is disposed between:
  a portion of the interior surface of the housing defined by the upstream end of the housing, and
  the upstream-facing surface of the second portion of the biased-closed valve member.

9. The assembly according to claim 8, wherein the upstream-facing surface of the second portion of the biased-closed valve member defines a circumferential projection that is sized for receiving a downstream end of the spring.

10. The assembly according to claim 7, wherein the downstream-facing surface of the second portion of the biased-closed valve member defines a circumferential recess, wherein an O-ring is disposed within the circumferential recess.

11. The assembly according to claim 7, wherein the downstream-facing surface of the second portion of the biased-closed valve member defines an annular recess.

12. The assembly according to claim 11, wherein the first portion of the biased-closed valve member includes an upstream-facing surface and a downstream-facing surface.

13. The assembly according to claim 12, wherein the upstream-facing surface of the first portion of the biased-closed valve member defines an annular projection, wherein the annular projection is disposed within the annular recess of the downstream-facing surface of the second portion of the biased-closed valve member for connecting the first portion of the biased-closed valve member to the second portion of the biased-closed valve member.

14. The assembly according to claim 13, wherein the downstream-facing surface of the first portion of the biased-closed valve member defines a recess, wherein an O-ring is disposed within the recess.

15. The assembly according to claim 1, wherein the closure member further includes an outer side surface extending between and connecting the upstream-facing surface to the downstream-facing surface, wherein the outer side surface of the closure member defines a recess, wherein an O-ring is disposed within the recess.

16. The assembly according to claim 1, wherein the fluid inlet is in fluid communication with a fuel tank.

17. The assembly according to claim 16, wherein the fuel tank is supported by a vehicle, wherein the vehicle is an aircraft.

* * * * *